UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

935,781.

No Drawing.

Specification of Letters Patent. Patented Oct. 5, 1909.

Application filed May 15, 1909. Serial No. 496,112.

*To all whom it may concern:*

Be it known that I, JOSEPH DEINET, citizen of the German Empire, residing at Elberfeld, Germany, have invented new and useful Improvements in Vat Dyestuff, of which the following is a specification.

My invention relates to the production of a new anthracene derivative. It is obtained by converting the 1.5-diamino-8-oxyanthraquinone into its dibenzoylated derivative. The reaction is carried out by treating 1.5-diamino-8-oxyanthraquinone with benzoyl chlorid.

Example: 10 parts of 1.5-diamino-8-oxyanthraquinone are heated to boiling for about half an hour with 100 parts of nitrobenzene and 40 parts of benzoyl chlorid. The new condensation product crystallizes from the cooling liquid in the shape of red crystals which are filtered off and dried. It is soluble in pyridin with a red color, in a small quantity of concentrated sulfuric acid with a bluish-gray color, while on addition of more acid the solution appears red. By treatment with hydrosulfite and NaOH a red vat is obtained which dyes cotton, wool or silk blue-red shades.

I claim:

The herein described new vat dyestuff of the anthracene series which is the 1.5-dibenzoyldiamino-8-oxyanthraquinone, which dyestuff is, after being dried and pulverized, a red powder which is soluble in pyridin with a red color; soluble in a small quantity of concentrated sulfuric acid with a bluish-gray color, while on addition of more acid the solution appears red, giving a red vat with hydrosulfite and caustic soda lye, which vat dyes the textile fiber bluish-red shades, substantially as described.

In testimony whereof I have hereunto set my hand in the presence of two subscribing witnesses.

JOSEPH DEINET. [L. S.]

Witnesses:
OTTO KÖNIG,
C. J. WRIGHT.